United States Patent
Kelkar et al.

(10) Patent No.: US 8,930,646 B2
(45) Date of Patent: Jan. 6, 2015

(54) CHARACTERIZATION AND OPTIMIZATION OF TRACKS ON DISKS

(75) Inventors: Bhooshan P. Kelkar, Pune (IN); Sneha M. Mone, Pune (IN)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 13/039,153

(22) Filed: Mar. 2, 2011

(65) Prior Publication Data

US 2012/0226874 A1 Sep. 6, 2012

(51) Int. Cl.
  *G06F 12/00* (2006.01)
  *G06F 3/06* (2006.01)
  *G11B 27/36* (2006.01)

(52) U.S. Cl.
  CPC .............. *G06F 3/064* (2013.01); *G06F 3/0674* (2013.01); *G11B 2220/2516* (2013.01); *G06F 3/061* (2013.01); *G11B 27/36* (2013.01)
  USPC ........................................................ 711/154

(58) Field of Classification Search
  USPC ........................................................ 711/154
  See application file for complete search history.

(56) References Cited

U.S. PATENT DOCUMENTS

| | | | |
|---|---|---|---|
| 5,333,311 A * | 7/1994 | Whipple, II | 1/1 |
| 6,202,118 B1 * | 3/2001 | Klein | 711/4 |
| 6,400,892 B1 | 6/2002 | Smith | |
| 7,325,095 B2 | 1/2008 | Williams | |
| 7,603,530 B1 * | 10/2009 | Liikanen et al. | 711/162 |
| 7,706,091 B2 | 4/2010 | Furuhashi et al. | |
| 7,747,907 B2 | 6/2010 | Olds et al. | |
| 2002/0166026 A1 * | 11/2002 | Ulrich et al. | 711/114 |
| 2003/0204699 A1 * | 10/2003 | Talagala et al. | 711/202 |
| 2008/0028008 A1 * | 1/2008 | Brunet et al. | 707/204 |
| 2009/0006468 A1 * | 1/2009 | Shankar et al. | 707/103 Y |
| 2009/0113160 A1 | 4/2009 | Ferraro | |
| 2009/0244775 A1 | 10/2009 | Ehrlich | |

OTHER PUBLICATIONS

Yuhui Tang, Xiaodong Che, Hyung Jai Lee, and Jian-Gang Zhu, Fellow, IEEE, "Understanding Adjacent Track Erasure in Discrete Track Media" Sep. 2008, Department of Electrical and Computer Engineering, Carnegie Mellon University, Pittsburgh, PA 15213, USA and Samsung Information Systems America, IEEE Transactions on Magnetics, vol. 39, No. 5.*

Roger Bitar, "Deploying Hybrid Storage Pools With Sun Flash Technology and the Solaris ZFS™ File System," Sun Microsystems, Sun BluePrints Online, Part No. 820-5881-10, Revision 1.0, Oct. 31, 2008, 17 pages.

Tang. et al., Understanding Adjacent Track Erasure in Discrete Track MediaIEEE Transactions on Magnetics, Sep. 2008, Department of Electrical and Computer Engineering, Pittsburgh, PA.

Gartner, Gartner Says a Green Data Centre Means More than Energy Efficiency, Oct. 20, 2008 Gartner's Data Center Summit 2008 Egham, UK.

(Continued)

*Primary Examiner* — Brian Peugh
(74) *Attorney, Agent, or Firm* — Griffiths & Seaton PLLC

(57) ABSTRACT

Embodiment of the invention related to characterization and optimization of tracks on a disk, magnetic or optical by determining an input/output (I/O) characteristics for a plurality of blocks on a disk by a processor, wherein the characteristics comprise at least one of a data size or data type or an association between the data files, and determining a plurality of parameters affecting operation performed on the disk for placement of the plurality of data clusters.

20 Claims, 2 Drawing Sheets

(56) References Cited

OTHER PUBLICATIONS

IBM Project Big Green Tackles Global Energy Crisis, Jun. 11, 2008, 4 pages, http://www-03.ibm.com/press/us/en/pressrelease/24395.wss, IBM, Armonk, NY.

IBM Unveiis Plan to Combat Data Center Energy Crisis; Allocates $1 Billion to Advance "Green" Technology and Services, May 10, 2007, 4 pages, http://www-03.ibm.com/press/us/en/pressrelease/21524.wss New York, NY, May 19, 2014.

Weil et al., "CRUSH: Controlled, Scalable, Decentralized Placement of Replicated Data", 12 pages, Nov. 2006, IEEE, Tampa, FL.

* cited by examiner

CHARACTERIZATION AND OPTIMIZATION OF TRACKS ON DISKS

BACKGROUND

Data remanence is an act of securely purging data such that there are no residuals of the data on the hard disk. Regulations exist which mandate the need for secure deletion according to various standards. A hard disk drive includes one or more hard disks clamped to a rotating spindle and at least one head for reading or writing data on the disk. Storage on a hard disk is divided into "blocks", which are in turn grouped into "tracks". A disk head uses magnetism to read or write data onto the tracks. Data remanence involves the overwriting of blocks on a track by the disk head numerous times, depending on the standard being applied. Thus, data remanence involves multiple input/output (I/O) operations on the same blocks of a track.

As a track on the hard disk is written, adjacent tracks may be overwritten by the magnetic field generated in the disk head, and data recorded in the adjacent tracks may be erased or corrupted as a result. This phenomenon is called adjacent track erasure (ATE) or adjacent track interference (ATI) and are aggravated by the multiple overwrites required by secure deletion. In one approach to counter ATE or ATI, when a track has been overwritten a certain number of times, the adjacent tracks are read and rewritten, hence refreshing the data on the adjacent tracks. However, the I/O operations required in the refreshing of the adjacent tracks impose a performance penalty on the hard disk drive. Increasing the number of track refreshes also increases the power consumption of the hard drive.

BRIEF SUMMARY

Embodiment of the invention, relate to a system, a method and a computer program product for characterization and optimization of tracks on a disk, which includes: determining at least one of an input or output characteristics for a plurality of blocks on a disk by a processor, wherein the characteristics include at least one of a data size or data type or an association between the data files. A plurality of blocks is assigned to the categories of input/output characteristics by the processor. Similar categories of content are determined and clustered together, thereby generating data clusters.

Additionally, cost of operation of the disk for possible placement configurations of the data clusters is determined and optimal map for the plurality of data clusters is estimated based on the cost of operations of the disk, which is estimated using a multi-modal optimization method for one of a set of Genetic Algorithm, Fuzzy Neural Networks, Simulated annealing or Threshold Accepting. Preferably the disks can comprise at least one from the following media types—magnetic or optical

DETAILED DESCRIPTION

Figure 1:
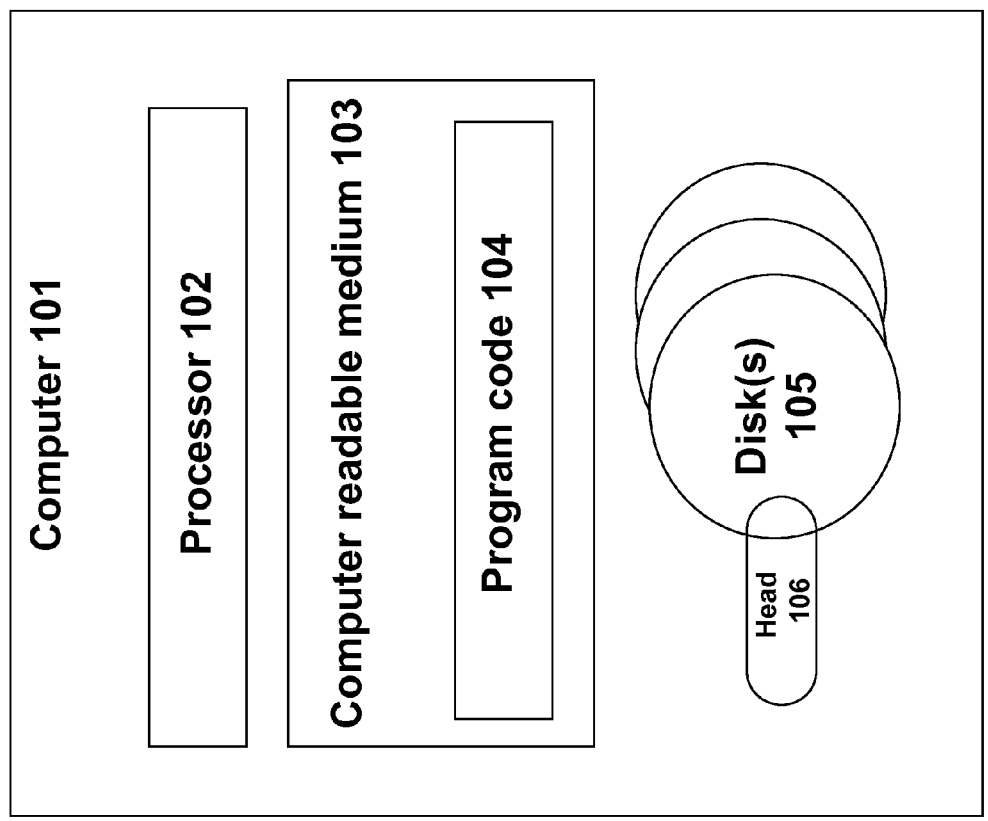
FIG. 1 illustrates an exemplary embodiment of a system for characterization and optimization of tracks on disks according to the present invention.

As will be appreciated by one skilled in the art, aspects of the invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the embodiments of the invention described herein, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams illustrate exemplary architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates an exemplary embodiment of a system for characterization and optimization of tracks on disks according to an embodiment of the present invention. It should be obvious to one skilled in the art that disk cover a wide range of media including and not limiting to those formed using magnetic material, optical media and the likes. The system consists of a computer 101 operationally coupled to a disk drive comprising one or more disks 105, where data is read and written to tracks on the disk 105 by a disk head 106. The computer 101 is further operationally coupled to a processor 102 and a computer readable medium 103. The computer readable medium 103 stores computer readable program code 104 for implementing the method of the present invention. The processor 102 executes the program code 104 for characterization and optimization of tracks on disks 105 according to the various embodiments of the present invention.

According to an embodiment of the present invention models, future changes of the data to be stored on the disk and then predicts the optimal map for placing the data on the disk, such that the remanence and performance needs are met and optimum usage of power consumed, the cost of operation being optimal, for reading and writing data, etc., by the disk is accomplished. The operation intensive data are further identified and its placement is considered to enhance performance of the disk.

In one embodiment, data with similar characteristics are assigned to the same category and clustered in one or more continuous tracks on the disk 105. By performing this clustering, blocks with a high number of I/O operations are grouped and stored on fewer tracks than if they were scattered across numerous tracks. This reduces the number of tracks that experience a relatively high number of I/O operations. The I/O characteristics may include, but is not limited to, the access frequency of the plurality of blocks, the secure deletion requirements, and a time dimension where the access frequencies of blocks may vary from time period to time period. However, a question arises in determining the placement of these data clusters on the disk 105 to optimize performance and power consumption. Although the following embodiment(s) are described in the context of data clusters as set forth here, one of ordinary skill in the art will understand that other methods of clustering data may be used without departing from the spirit and scope of the present invention. Additionally, data clusters of any size may be used, including a cluster comprising one block.

Figure 2:
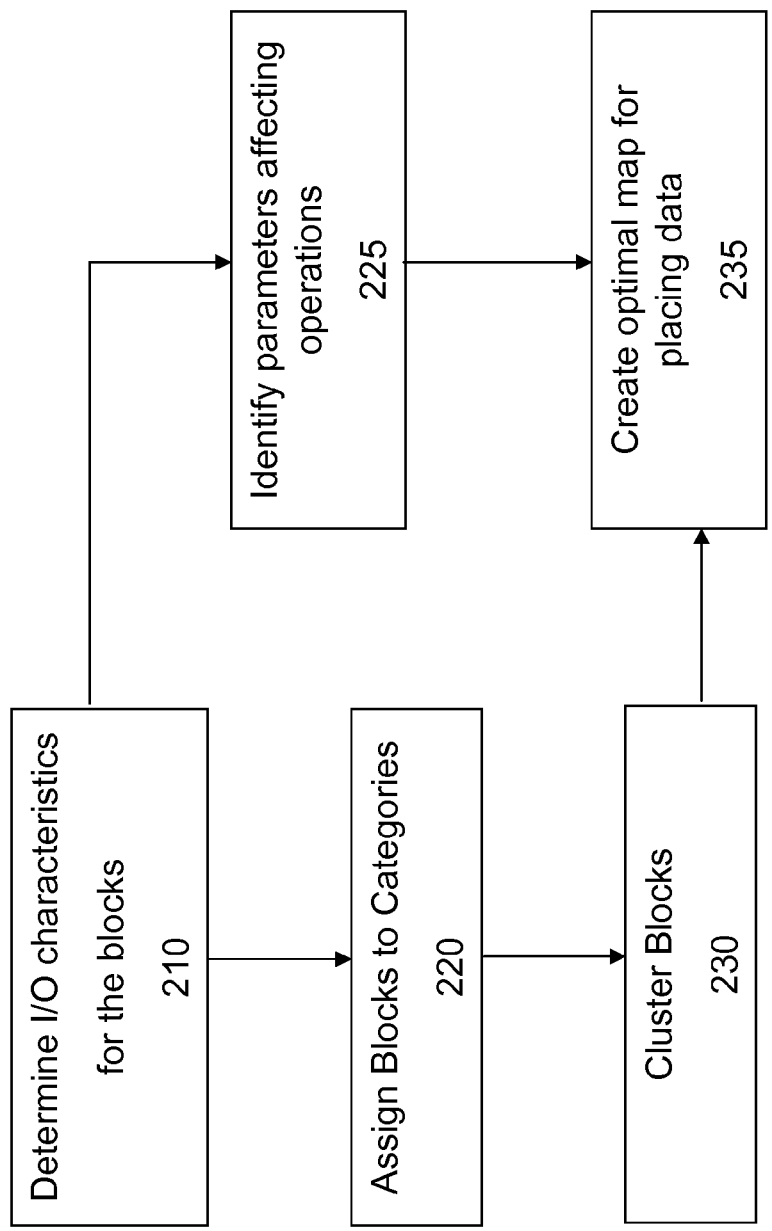
FIG. 2 is a flowchart illustrating an exemplary embodiment for smart characterization and optimization of tracks on disks according to the present invention.

FIG. 2 is a flowchart illustrating an exemplary embodiment for characterizing and optimization of tracks on disks according to embodiments of the present invention. The method determines the I/O characteristics of data clusters to be stored on the disk. Using the I/O characteristics, the method determines a plurality of costs of operation of the disk for a plurality of possible placement configurations for the data clusters on the disk. From the plurality of costs of operation, the method determines an optimal placement map for the data clusters.

In this embodiment, the optimal placement map is determined using a multivariate fuzzy cost model which takes into account any combination of characteristics, including but not limited to: track characteristics; data remanence levels; I/O throughput or delay; ATE-data refresh I/O and power penalties; and frequency of access and usage pattern of data impacting power consumption.

In step 210 the exemplary embodiment of the invention is to determining input/output (I/O) characteristics for a plurality of blocks on a disk by a processor, wherein the characteristics further comprise at least one of these: a data size or data type or an association between the data files. In one embodiment the association between the data files is determined from historical data or the association between the data files is determined using pattern recognition. The pattern recognition further includes association discovery, clustering and statistics. In step 220 the plurality of blocks are assigned to a plurality of categories of I/O characteristics by the processor, and the plurality of blocks belonging to a similar category in one or more continuous tracks on the disk by the processor is determined. In step 230 the plurality of blocks belonging to the similar category is categorized, thereby generating a plurality of data clusters.

The data type is characterized by an extension associated with the data file. In step 225 a plurality of parameters affecting operation performed on the disk for placement of the plurality of data clusters is identified or determined, where the parameters affecting operations performed on the disk include and are not limited to at least one of cost of operation of disk or time for retrieval of data from disk or time for writing data on the disk. In step 235 based on the parameters affecting operations performed on the disk an optimal map for placing the plurality of data clusters in the similar category is determined. In deciding the optimal map for placing the plurality of data clusters, both clustering and the parameters affecting operations are important. It should also be noted that their relative weightage may be decided using an expert system or by human expertise. It should also be noted that the optimal map for placing is performed using a multi-modal operation selected from a group of Genetic Algorithm or Simulated Annealing or Fuzzy Neural Networks or Threshold Accepting and should be obvious to one skilled in the art that other forms of multi-modal operations not mentioned herein are also covered within the scope and spirit of the invention.

For example, track characteristics may include, but are not limited to, outer disk tracks being computationally expensive to refresh since they are bigger in size. Thus, blocks with high remanence levels may be clustered together and placed on an inner track of the disk to lessen the efforts to refresh adjacent racks, in turn lessening the power and performance penalty.

For another example, the outer tracks of the disk have a larger circumference and thus require less effort to access the data. Blocks with high access frequency or usage may be clustered together and placed on an outer track of the disk to lessen the performance penalty. Seek time is lessened because the head/writing element traverse only a narrow band. Data transfer rate is increased because more data passes by the head/writing element with each revolution of the disk.

In an embodiment of the invention, an ant colony optimization (ACO) algorithm is used to find the optimal placement map. The ACO algorithm is a meta-heuristic approach that uses a combination of distributed computation, positive feedback, and constructive greediness to find an optimal solution for combinatorial optimization problems. The concept of the ACO is known in the art and will not be described in detail here.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method comprising:
   determining an input/output (I/O) characteristics for a plurality of blocks on a disk by a processor, wherein the I/O characteristics comprise an access frequency of the plurality of blocks, secure deletion requirements, a time dimension where the access frequencies of blocks may vary from one time period to an alternative time period, a data size, a data type, and an association between data files;
   determining a plurality of costs of operations on the disk using the I/O characteristics for one of a plurality of placement configurations for a plurality of data clusters on the disk; and
   modeling future changes of data to be stored on the disk and then determining an optimal map for placing the plurality of data clusters from the plurality of costs of operations.

2. The method as claimed in claim 1, wherein the association between the data files is determined from historical data.

3. The method as claimed in claim 1, wherein the association between the data files is determined using pattern recognition.

4. The method as claimed in claim 3, wherein the pattern recognition further includes association discovery, clustering and statistics.

5. The method as claimed in claim 1, further comprising
   assigning the plurality of blocks to a plurality of categories of I/O characteristics by the processor;
   determining the plurality of blocks belonging to a similar category in one or more continuous tracks on the disk by the processor; and
   clustering the plurality of blocks belonging to the similar category, thereby generating a plurality of data clusters.

6. The method as claimed in claims 1, wherein the data type is characterized by an extension associated with the data file.

7. The method as claimed in claim 1, further comprising
   determining a plurality of parameters affecting operation performed on the disk for placement of the plurality of data clusters.

8. The method as claimed in claim 7, wherein the parameters affecting operations performed on the disk includes at least a cost of operation for the disk and a time for retrieval of data from disk and a time for writing data on the disk.

9. The method as claimed in claim 7 further comprising determining an optimal map for placing the plurality of data clusters in the similar category based on the parameters affecting operations performed on the disk.

10. The method as claimed in claim 9, wherein the optimal map for placing is performed using a multi-modal operation selected from a group of Genetic Algorithm or Simulated Annealing or Fuzzy Neural Networks or Threshold Accepting.

11. A system comprising at least a processor and a memory configured for:
   determining an input/output (I/O) characteristics for a plurality of blocks on a disk by a processor, wherein the I/O characteristics comprise an access frequency of the plurality of blocks, secure deletion requirements, a time dimension where the access frequencies of blocks may vary from one time period to an alternative time period, a data size, a data type, and an association between data files;

determining a plurality of costs of operations on the disk using the I/O characteristics for one of a plurality of placement configurations for a plurality of data clusters on the disk; and modeling future changes of data to be stored on the disk and then determining an optimal map for placing the plurality of data clusters from the plurality of costs of operations.

12. The system as claimed in claim 11, wherein the association between the data files is determined from at least one of historical data or pattern recognition.

13. The system as claimed in claim 12, wherein the pattern recognition further includes association discovery, clustering and statistics.

14. The system as claimed in claim 11, further configured for assigning the plurality of blocks to a plurality of categories of I/O characteristics by the processor;

determining the plurality of blocks belonging to a similar category in one or more continuous tracks on the disk by the processor; and clustering the plurality of blocks belonging to the similar category, thereby generating a plurality of data clusters.

15. The system as claimed in claims 11, wherein the data type is characterized by an extension associated with the data file.

16. The system as claimed in claim 11, further configured for determining a plurality of parameters affecting operation performed on the disk for placement of the plurality of data clusters, wherein the parameters affecting operations performed on the disk includes at least a cost of operation for the disk and a time for retrieval of data from disk and a time for writing data on the disk.

17. The system as claimed in claim 16 further configured for determining an optimal map for placing the plurality of data clusters in the similar category based on the parameters affecting operations performed on the disk, wherein the optimal map for placing is performed using a multi-modal operation selected from a group of Genetic Algorithm or Simulated Annealing or Fuzzy Neural Networks or Threshold Accepting.

18. A computer program product for optimization of tracks on a hard disk, the computer program product comprising: a non-transitory computer readable storage medium having computer readable program code embodied therewith, the computer readable program code configured for:

determining an input/output (I/O) characteristics for a plurality of blocks on a disk by a processor, wherein the I/O characteristics comprise an access frequency of the plurality of blocks, secure deletion requirements, a time dimension where the access frequencies of blocks may vary from one time period to an alternative time period, a data size, a data type, and an association between data files;

determining a plurality of costs of operations on the disk using the I/O characteristics for one of a plurality of placement configurations for a plurality of data clusters on the disk; and modeling future changes of data to be stored on the disk and then determining an optimal map for placing the plurality of data clusters from the plurality of costs of operations.

19. The computer program product as claimed in claim 18, further configured for assigning the plurality of blocks to a plurality of categories of I/O characteristics by the processor;

determining the plurality of blocks belonging to a similar category in one or more continuous tracks on the disk by the processor; and clustering the plurality of blocks belonging to the similar category, thereby generating a plurality of data clusters.

20. The computer program product as claimed in claim 18 further configured for determining a plurality of parameters affecting operation performed on the disk for placement of the plurality of data clusters, wherein the parameters affecting operations performed on the disk includes at least a cost of operation for the disk and a time for retrieval of data from disk and a time for writing data on the disk; and determining an optimal map for placing the plurality of data clusters in the similar category based on the parameters affecting operations performed on the disk , wherein the optimal map for placing is performed using a multi-modal operation selected from a group of Genetic Algorithm or Simulated Annealing or Fuzzy Neural Networks or Threshold Accepting.

* * * * *